(12) United States Patent
Trida et al.

(10) Patent No.: US 6,192,785 B1
(45) Date of Patent: Feb. 27, 2001

(54) AUTOMATIC DISPENSER OF FROTHED MILK AND PRE-MADE LIQUID COFFEE

(76) Inventors: Roberto Trida; GianCarlo DeBattisti, both of 3640 Yacht Club Dr. #1601, Aventura, FL (US) 33180-3573

( * ) Notice: Subject to any disclaimer, the term of this patent is extended or adjusted under 35 U.S.C. 154(b) by 0 days.

(21) Appl. No.: 09/534,597

(22) Filed: Mar. 27, 2000

(51) Int. Cl.[7] .................................................. A47J 31/40
(52) U.S. Cl. ............................. 99/284; 99/286; 99/288; 99/290; 99/293; 99/323.1; 99/275
(58) Field of Search ........................... 99/275, 279, 286, 99/287, 288, 290, 293, 323.1, 284, 300

(56) References Cited

U.S. PATENT DOCUMENTS

| | | | |
|---|---|---|---|
| 4,470,999 | * | 9/1984 | Carpiac .............................. 99/275 X |
| 4,649,809 | * | 3/1987 | Kanezashi .............................. 99/290 |
| 5,265,520 | * | 11/1993 | Giuliano .............................. 99/293 X |

* cited by examiner

*Primary Examiner*—Reginald L. Alexander

(57) ABSTRACT

An automatic dispenser of frothed milk and pre-made liquid coffee received from refrigerated milk and pre-made liquid coffee containers that selectively delivers cold and hot Italian-style coffees, such as, cappuccino, latte, espresso, and other. The refrigeration mechanism is based in Peltier effect and has a chamber to store the milk and pre-made liquid containers which are accessible to a user. The heating mechanism includes a hot water tank and cone-shaped heat exchanger assemblies to heat the frothed milk and pre-made liquid coffee, respectively. The milk and pre-made liquid coffee are drawn by two separate pumps through fluid conduits from the refrigerated containers to the air valves to be frothed. If a user selects hot beverage, the flow is directed to the heat exchanger and then discharged through a nozzle to a cap. If a user selects cold beverage, the flow is directed to the nozzle to be discharged to the consumer.

12 Claims, 3 Drawing Sheets

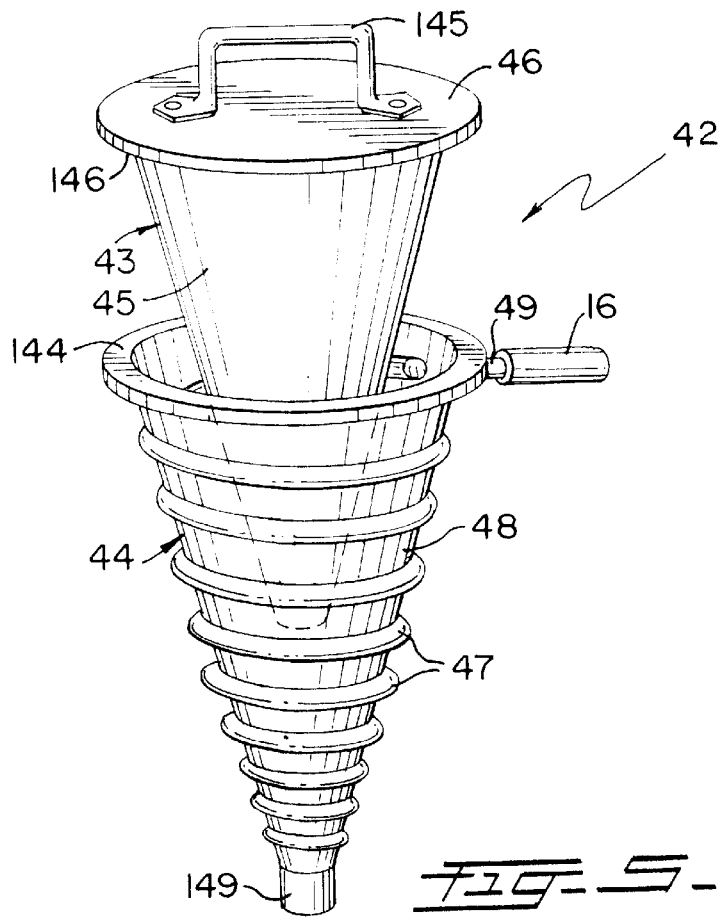
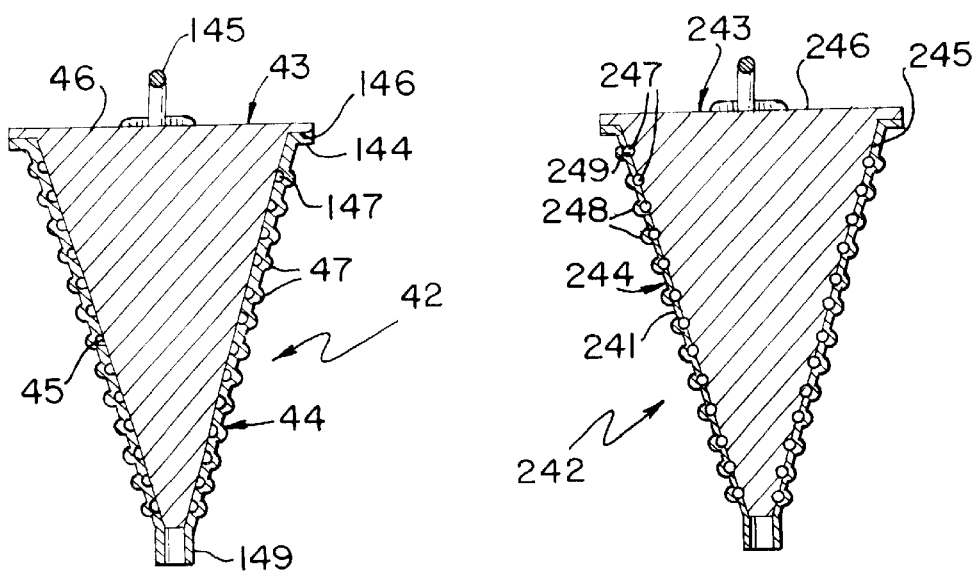

AUTOMATIC DISPENSER OF FROTHED MILK AND PRE-MADE LIQUID COFFEE

BACKGROUND OF THE INVENTION

1. Field of the Invention

The present invention relates to an automatic dispenser of frothed milk and pre-made liquid coffee that delivers cold and/or hot Italian-style coffees, such as, cappuccino, latte, espresso, and others. And, more particularly to the type that includes refrigerated milk and pre-made liquid coffee supplies from which milk and liquid coffee are drawn, frothed and dispensed.

2. Description of the Related Art

Many coffee machines exist nowadays that brew coffee beverage with an incorporated system to froth milk and deliver the mix of frothed milk and brewed coffee in a final beverage called cappuccino, latte, etc. However, none of them discloses the features of the present invention.

The present invention discloses an automatic machine that operates with a pre-made liquid coffee alone or in combination with milk. As it occurs in a conventional commercial coffee/cappuccino maker, it is required a trained personnel to operate the machine and thus the quality of the brewed coffee beverage depends on the experience of the operator. The present invention overcomes this shortcoming as this machine does not use ground coffee beans neither pressurized hot water, but pre-made espresso coffee ready to be consumed.

Another advantage of this invention is that is portable. The disclosed machine herein does not need to be connected to a tap water supply as other commercial machines do when pre-heated water passes through coffee grounds to produce the desired coffee beverage.

Another advantage of this invention is that the machine includes a simple refrigeration mechanism to refrigerate liquid coffee and milk containers that operates at 12 Volts based in the well known Peltier effect. This is a simple mechanism that does not require, as in the conventional refrigeration mechanism, a compressor neither gas, thereby making the manufacturing production of the machine less costly.

Another novelty of this invention is the cone-shaped heat exchanger assembly that is automatically emptied by gravity for each service and includes a removable member that can be easily opened for cleaning and sanitation. This technical solution has been studied and developed to overcome any problem of milk deposits that are always difficult to clean when they are inside a conventional coil exchanger.

SUMMARY OF THE INVENTION

It is one of the main objects of the present invention to provide an automatic dispenser that delivers cold or heated frothed milk and liquid pre-made coffee.

It is another object of this invention to provide a dispenser that is easy to operate thereby being accessible to any user.

It is another object of this invention to provide a dispenser that is practical and versatile permitting the selection of hot or cold milk and hot or cold coffee.

It is another object of this invention to provide a machine that includes air inlet valves to selectively and independently froth the milk and coffee through their respective conduits.

It is another object of this invention to provide a dispenser that includes such a pump permitting the drawing of the liquids and emulsification of air and the milk, and in the same manner, air and the liquid coffee.

It is another object of this invention to provide a dispenser that does not need water supply except the water contained in the heating mechanism.

It is another object of this invention to provide a dispenser that includes a heating mechanism to heat the frothed milk and liquid coffee, respectively.

It is another object of this invention to provide a dispenser that has a compact structure and is volumetrically efficient to transport and store.

It is another object of this invention to provide a dispenser that has such a heating mechanism permitting a user to easily and effectively clean the internal surfaces of the heating exchanger assemblies.

It is still an object of this invention to provide a dispenser that provides a simple refrigeration mechanism that operates at 12 volts to refrigerate coffee and milk containers.

It is yet another object of this invention to provide such a machine that is less costly to manufacture and maintain while retaining its effectiveness.

Further objects of this invention will be brought out in the following part of the specifications, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 5 is an isometric view of the preferred cone-shaped heating assembly.

FIG. 6 is an elevational cross-sectional view of the heating assembly shown in the FIG. 5.

FIG. 7 is an elevational cross-sectional view of an alternate heating assembly.

DETAILED DESCRIPTION OF THE PREFERRED EMBODIMENT

Figure 1:
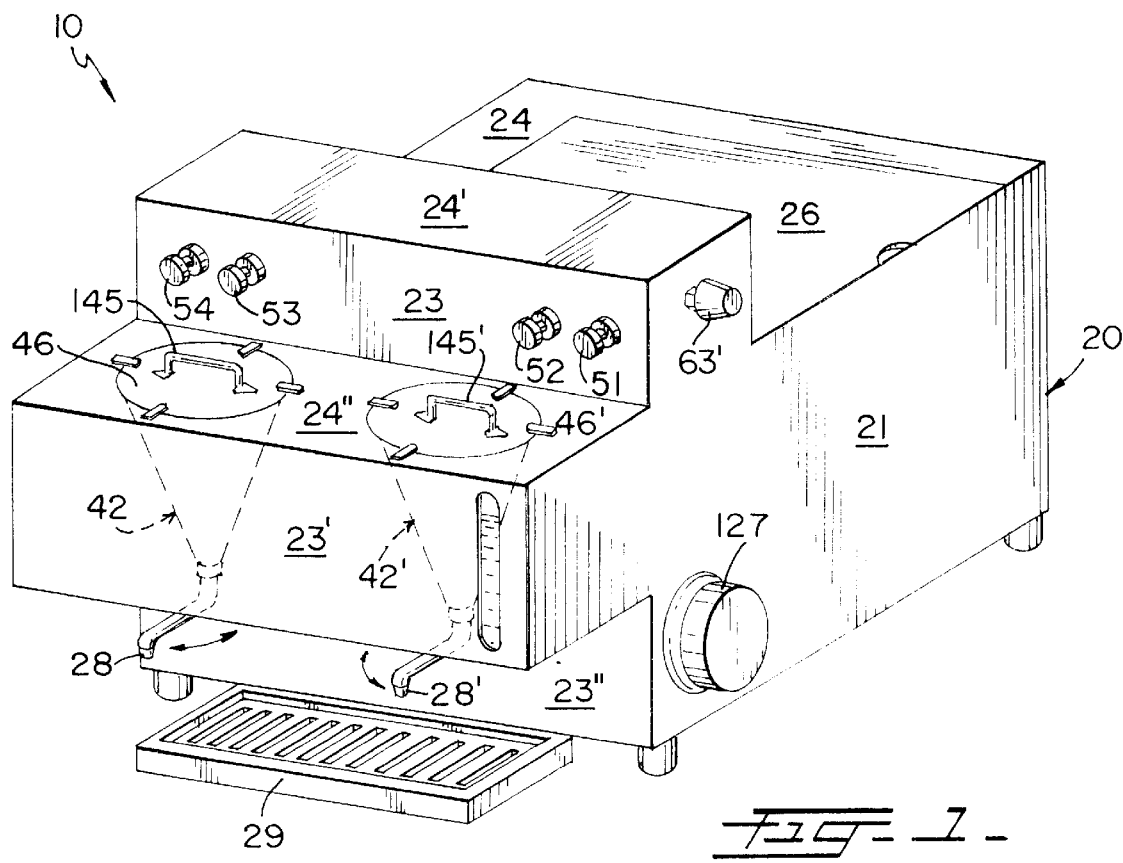
FIG. 1 is an isometric view from the top of the present invention.
Figure 3:
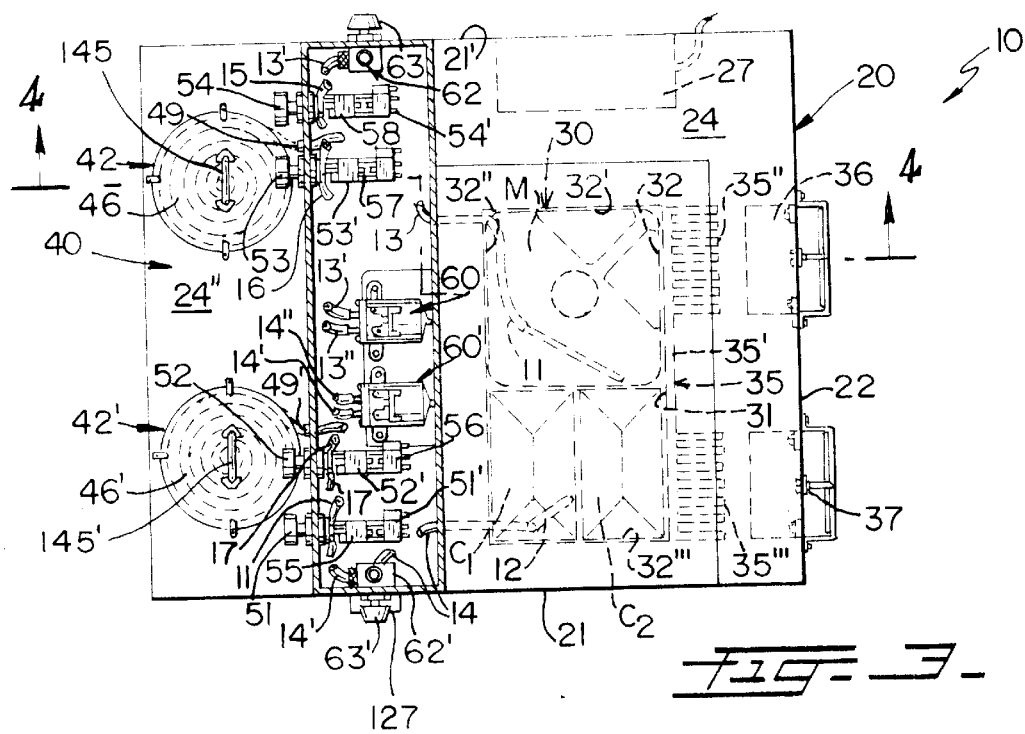
FIG. 3 is a cross-sectional top view of this invention, taken along of line 3—3.
Figure 4:
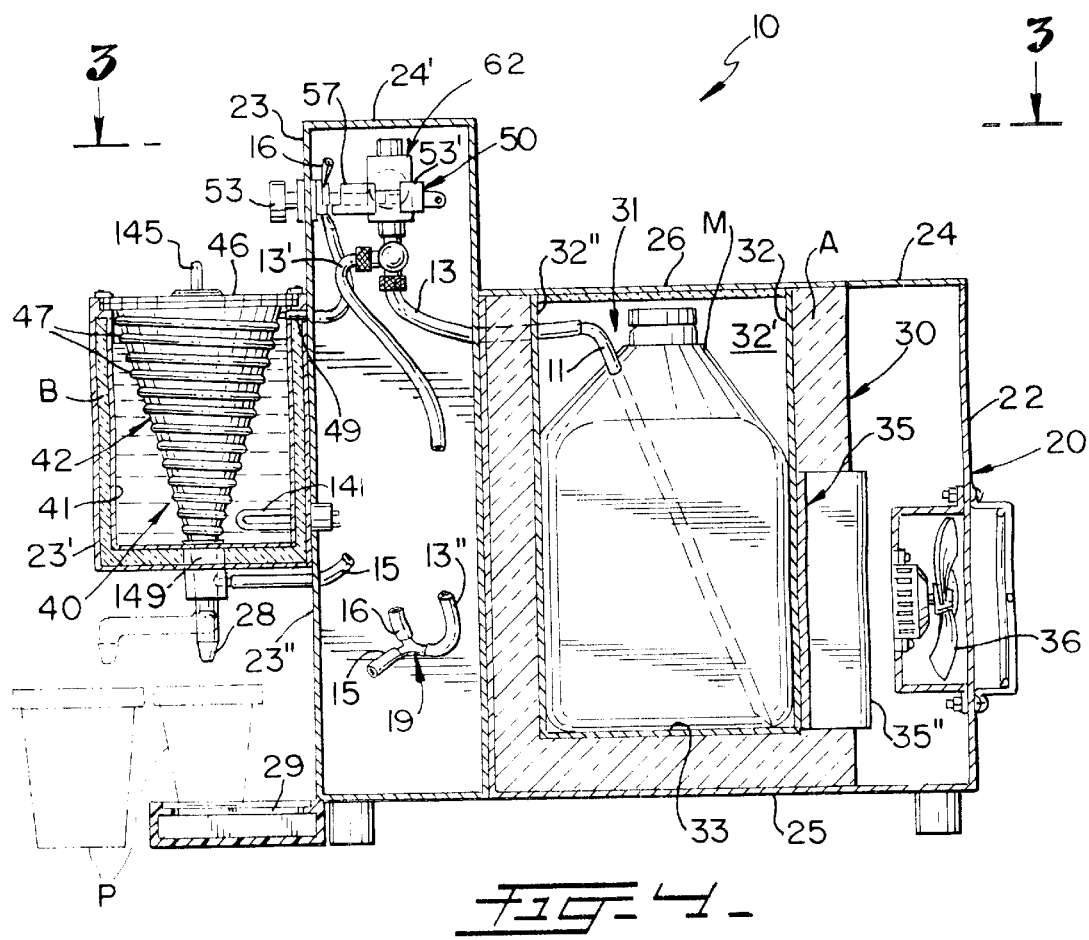
FIG. 4 is an elevational view of this invention, taken along line 4—4.

Referring now to the drawings in detail and initially to FIGS. 1, 3 and 4 thereof, it will be seen that the present invention referred to with numeral 10 basically includes housing 20 with refrigeration mechanism 30 and heating mechanism 40 and electrical actuating mechanism 50.

Housing 20, in the preferred embodiment, has side walls 21 and 21', rear wall 22, front walls 23, 23' and 23", top walls 24, 24' and 24", bottom wall 25 and hinged cover 26. Hinged cover 26 allows a user to access milk and liquid coffee supplies M and C1 and C2, respectively, which are located inside refrigeration chamber 31. Housing 20 also includes drainboard 29 that is removably mounted to front wall 23", as illustrated in FIG. 1.

Liquid coffee supplies C1 and C2, in the preferred embodiment, are liquid coffee ESPRE® manufactured by SOPRALCO S.R.L. at Via Roma Nord 151 Villa Poma Mantova Italy.

Refrigeration mechanism 30, as illustrated in FIGS. 3 and 4, includes refrigeration chamber 31 defined by lateral walls 32, 32', 32" and 32"', bottom wall 33 and hinged cover 26. Refrigeration chamber 31 is isolated with material A. Refrigeration mechanism 30, in the preferred embodiment, is based in the well-known Peltier effect. Plate member 35 is made out of metal and includes elongated planar section 35' and outwardly projected sections 35" and 35"'. Elongated planar section 35' is disposed along the width of wall 32. Plate member 35 is connected to a 12 Volts electric transformer 27 that polarizes the former. Transformer 27 transforms the electrical power from 110 Volts (AC) to 12 Volts (DC). In this manner, elongated planar section 35' turns cold and outwardly projected sections 35" and 35"' turn hot. As shown in FIGS. 3 and 4, plate member 35 is connected to lateral wall 32 thereby transmitting the temperature of the former to lateral wall 32 and thus to walls 32', 32", 32"' and 33. This effect generates a temperature inside refrigeration chamber 31 of approximately 3° C. (37° F.). Milk supply M and liquid coffee containers C1 and C2 are stored in refrigeration chamber 31. Refrigeration mechanism 30 also includes fan members 36 and 37 that are positioned at a parallel and spaced apart relationship with respect to sections 35" and 35"'. Fan members 36 and 37 are designed to cool heated sections 35" and 35"' of plate member 35, as seen in FIGS. 3 and 4. Fan members 36 and 37 are mounted to rear wall 22 of housing 20.

As seen in FIGS. 3 and 4, the milk and coffee are drawn through suction pipes 11 and 12, respectively. Suction pipes 11 and 12 are made out of stainless steel metal and also are designed to pierce milk and coffee supplies M and C1 (the same apply to supply C2). The uppermost section of pipe members 11 and 12 are connected to hose or flow conduit 13 and 14, respectively. Alternatively, hose or flow conduit 13 and 14 may be inserted through the accessible opening of supplies M and C1 without the need of pipes 11 and 12. The adjournment of the milk and coffee flow will be described below.

Heating mechanism 40, in the preferred embodiment, basically includes water tank 41 and heat exchanger assemblies 42 and 42'. Water tank 41 contains hot water heated by heating coil member 141 and is isolated with material B. Heat exchanger assemblies 42 and 42' are positioned inside water tank 41. Heat exchanger assemblies 42 and 42' have a cone configuration. Heat exchanger assemblies 42 and 42' are similar and are designed to heat milk and liquid coffee, respectively. As best shown in FIGS. 5 and 6, heat exchanger assembly 42 includes removable member 43 and rigid member 44. Member 43, in the preferred embodiment, has even lateral wall 45 and top wall or cap 46. Rigid member 44 has outer groove 47 that is outwardly projected with respect to wall 48. Groove 47 has a C-shaped cross section. Groove 47 is disposed around and along member 44 forming a spiral. FIG. 6 illustrates cone-shaped members 43 and 44 assembled. Lateral wall 45 of removable member 43 and the internal surface of groove 47 define space 147 through which the milk (or liquid coffee in heat exchanger assembly 42') flows while is heated. Top wall or cap 46 has flange 146 that is cooperatively placed over flange 144 of rigid member 44. Member 44 also has tubular inlet 49 and tubular outlet 149. Inlet 49 and outlet 149 are connected to member 44, specifically, to the beginning and end of elongated groove 47.

Side wall 21 of housing 20, in the preferred embodiment, has thermostat 127 mounted thereto and is designed to control the temperature of the water in heating mechanism 40 below the boiling point. There is a minimum of evaporation of the water and therefore the refill of water tank 41 is needed only after several hours of use.

Electrical actuating mechanism 50, in the preferred embodiment, includes a plurality of actuating buttons 51, 52, 53 and 54 with respective micro switch members 51', 52', 53' and 54', and electrical pump members 60 and 60'. Actuating buttons 51, 52, 53 and 54, in the preferred embodiment, are mounted to front wall 23 and represent cold coffee, hot coffee, cold milk and hot milk, respectively. Pump members 60 and 60' are similar and independently work for milk and coffee flow. Pumps 60 and 60', in the preferred embodiment, work at 12 volts and are of the volumetric category and gear type with following technical characteristics: plastic material, direct current motor with brush collector and working voltage range 9–12 Volts.

Figure 2:
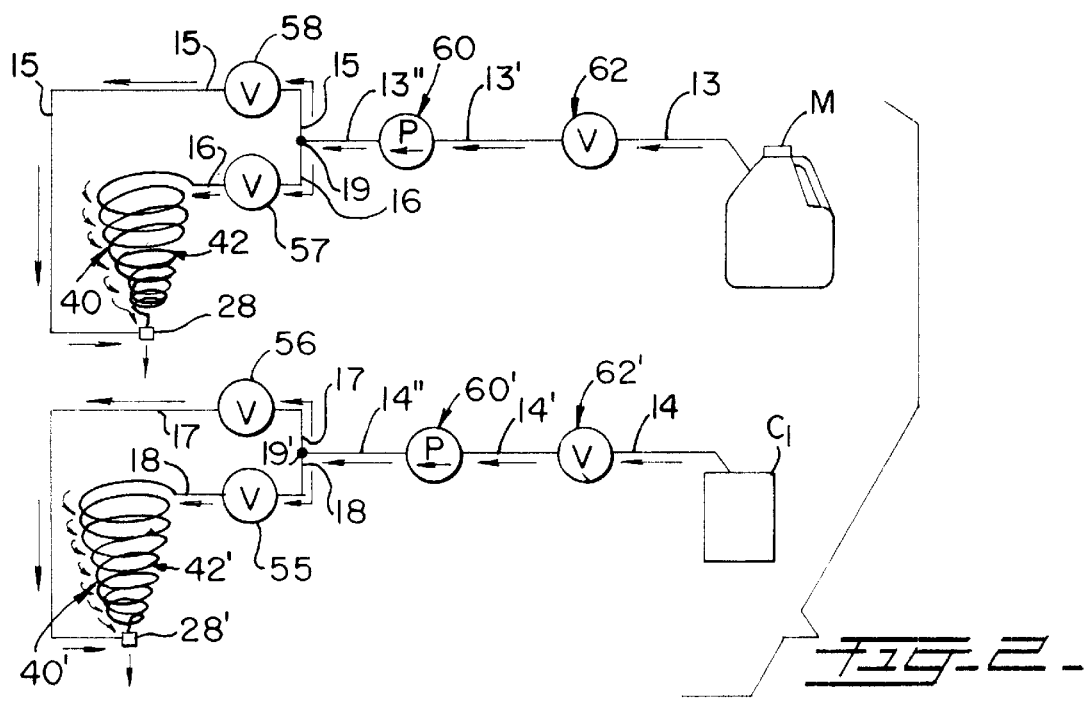
FIG. 2 is a schematic diagram of the fluid flow from the coffee and milk supplies to the discharging point.

FIG. 2 illustrates a diagram that explains the fluid flow in the present invention. Once a user actuates one of actuating buttons 51, 52, 53 or 54, respective micro switch member 51', 52', 53' or 54' is electrically activated, that in turn actuates pump 60 or 60'. Simultaneously, respective throttle valves 55, 56, 57 or 58 releases squeezed hose or flow conduit 15, 16, 17 or 18 thereby delivering the desired liquid. For example, if hot milk is desired, a user will actuate button 53 and pump 60 will draw cold milk from refrigerated milk supply M through probe 11 and hose 13. Hose 13 is connected to air valve 62. Air valve 62 draws air from the atmosphere and the air inflow is manually controlled by adjusting button 63. Then, the milk injected with air is suctioned into pump 60 through hose 13'. Pump 60 has the dual function of emulsifying and directing the flow to heating mechanism 40 through hose 13". Hose 13" is connected to tri-phased connector 19. Connector 19 connects hose 13" with hoses 15 and 16. When button 53 is actuated, flow travels through hose 16, which was previously squeezed, and then to inlet 49 of heat exchanger 42. Upon passage through heat exchanger assembly 42, the frothed milk is heated to the temperature set in thermostat 127. Finally, the hot frothed milk is discharged through nozzle 28 to cap P. Nozzle 28 rotates in that manner that a user can fit cap P of different sizes in the space defined by nozzle 28 and drainboard 29.

If hot coffee is desired, a user will actuate button 52 and pump 60' will draw cold coffee from refrigerated coffee supply C1 or C2 through probe 12 and hose 14. Hose 14 is connected to air valve 62' with adjusting button 63'. Then, the coffee injected with air is suctioned into pump 60' through hose 14'. Emulsified flow leaves pump 60' through hose 14". Hose 14" is connected to tri-phased connector 19'. Connector 19' connects hose 14" with hoses 17 and 18. When button 52 is actuated, flow travels through hose 17, which was previously squeezed, and then to inlet 49' of heat exchanger 42'. Finally, the hot frothed coffee is discharged through nozzle 28' to cap P.

In the event a user desires to consume cold frothed coffee alone or with milk, buttons 51 and/or 54 are actuated. The drawn milk and/or coffee, flow as above described up to pumps 60 and 60'. Then, the flow travels through tri-phased connector 19 and 19' to hoses 15 for milk and hose 18 for liquid coffee. Finally, the frothed coffee is discharged through nozzle 28' and milk through nozzle 28 to cap P.

FIG. 7 illustrates an alternative embodiment for a heat exchanger. Heat exchanger assembly 242 also has a cone configuration as assemblies 42 and 42' previously described. Heat exchanger assembly 242 includes removable member 243 and rigid member 244. Removable member 243 includes lateral wall 245 and top wall or cap 246. Lateral wall 245 has inner groove 247. Member 244 is similar to above described member 44. Member 244 has lateral wall 241 and outer groove 248. When cone-shaped members 243 and 244 are together, inner and outer grooves 247 and 248 are aligned defining space 249. Inner and outer grooves 247 and 248 are disposed around and along lateral walls 245 and 249 forming a spiral, respectively. Space 249 has a circular cross section and defines the conduit through which the milk or coffee flows while is heated.

The sanitation system consists of a very simple method of replacing milk and coffee supplies M and C1/C2 with hot water containers. All buttons 51, 52, 53 or 54 are subsequently actuated and the cleaning water flow is discharged through nozzle members 28 and 28'. The operation is repeated until the outcoming water is complete clean. Heating mechanisms 40 and 40' are disassembled by pulling handle members 145 and 145' of top wall or caps 46 and 46'. Removable members 43 and 43' (not shown) are removed and a user can easily clean removable and rigid members 43, 43', 44 and 44'.

The foregoing description conveys the best understanding of the objectives and advantages of the present invention. Different embodiments may be made of the inventive concept of this invention. It is to be understood that all matter disclosed herein is to be interpreted merely as illustrative, and not in limiting sense.

What is claimed is:

1. An automatic dispenser of frothed milk and pre-made liquid coffee received from cold milk and pre-made liquid coffee containers, that selectively delivers cold and hot Italian-style coffees, such as, cappuccino, latte, espresso, comprising:

a refrigeration mechanism to store said milk and pre-made liquid coffee containers including a refrigeration chamber defined by first, second, third and fourth lateral walls, bottom wall and hinged cover, wherein said refrigeration mechanism is based in Peltier effect;

a heating mechanism having first and second heat exchanger assemblies to heat the frothed milk and pre-made liquid coffee, respectively, said first and second heat exchanger have a cone configuration and are immerged in a water tank and said water tank includes a heating coil member to heat the contained water;

an actuating mechanism having first, second, third and fourth actuating buttons that are selectively actuated by a user and represent cold coffee, hot coffee, cold milk and hot milk, respectively;

first and second pump members to draw the cold milk and cold pre-made coffee, respectively, from said refrigerated milk and pre-made liquid coffee containers through fluid conduits, said first and second pump members work at 12 Volts and are of the volumetric category and gear type; and first and second air valve members to draw air from the atmosphere and froth the suctioned milk and pre-made coffee, respectively.

2. The automatic dispenser set forth in claim 1 wherein said refrigeration mechanism includes a metallic elongated plate member having elongated planar section and first and second outwardly projected sections wherein said elongated planar section is disposed along the width of said first lateral wall, said elongated plate member is connected to a 12 Volts electric transformer that polarizes the former and said elongated planar section turns cold and said first and second outwardly projected sections turn hot, and wherein said elongated planar section transmits the temperature to said first, second, third and fourth lateral walls and bottom wall.

3. The automatic dispenser set forth in claim 2 wherein said refrigeration mechanism further includes first and second fan members that are designed to cool said first and second outwardly projected sections, said first and second fan members are positioned at a parallel and spaced apart relationship with respect to said first and second outwardly projected sections, respectively.

4. The automatic dispenser set forth in claim 1 wherein said first and second heat exchanger assemblies include each a removable member and a rigid member.

5. The automatic dispenser set forth in claim 4 wherein said removable member has an even lateral wall and top wall.

6. The automatic dispenser set forth in claim 4 wherein said rigid member has a wall and an outer groove that is outwardly projected with respect to said wall, said outer groove has a C-shaped cross section and is disposed around and along said rigid member forming a spiral, and said even lateral wall and the internal surface of said groove define a space through which the milk, in said first heat exchanger assembly, and the pre-made coffee in said second heat exchanger assembly, flow while are heated.

7. The automatic dispenser set forth in claim 1 wherein said first, second, third and fourth actuating buttons have respective first, second, third and fourth micro switch elements that are in turn connected to said first and second pump members.

8. The automatic dispenser set forth in claim 7 wherein said first, second, third and fourth actuating buttons have respective first, second, third and fourth throttle valves that upon selective actuation of one of said first, second, third and fourth actuating buttons the squeezed portion of said fluid conduits is released to permit the frothed milk and coffee to flow through.

9. The automatic dispenser set forth in claim 1 further includes first and second nozzle members to discharge the frothed milk and coffee, respectively, and said first and second nozzle members rotate in that manner that a user can fit a cap of different sizes in the space defined by said first and second nozzle members and a drainboard.

10. The automatic dispenser set forth in claim 1 further includes a sanitation system consisting of replacing said milk and pre-made liquid coffee containers with hot water containers so that the hot water flows through said fluid conduits and discharges through said first and second nozzle members until the discharged water is clean, and said first and second heat exchanger assemblies are disassembled so that the user has access to clean the internal surfaces thereof.

11. The automatic dispenser set forth in claim 7 wherein said removable member has fifth lateral wall with inner groove and top wall, wherein said inner groove is inwardly projected with respect to said fifth lateral wall, said inner groove has a C-shaped cross section and is disposed around and along said rigid member forming a spiral.

12. The automatic dispenser set forth in claim 7 wherein said rigid member has sixth wall and an outer groove that is outwardly projected with respect to said sixth wall, said outer groove has a C-shaped cross section and is disposed around and along said rigid member forming a spiral, and said inner and outer grooves are aligned defining a circular cross sectional space through which the milk, in said first heat exchanger assembly, and the pre-made coffee in said second heat exchanger assembly, flow while are heated.

* * * * *